United States Patent [19]
Imes et al.

[11] Patent Number: 6,020,432
[45] Date of Patent: Feb. 1, 2000

[54] HIGH DENSITY POLYESTER COMPOSITION

[75] Inventors: Robert H. Imes, Somerset; Mengshi Lu, North Plainfield, both of N.J.

[73] Assignee: HNA Holdings, Inc., Warren, N.J.

[21] Appl. No.: 09/110,008

[22] Filed: Jul. 2, 1998

[51] Int. Cl.[7] .............. C08L 67/06; C08L 33/08; C08L 33/10; C08K 3/30
[52] U.S. Cl. ............ 525/166; 525/190; 524/423
[58] Field of Search ................... 525/166, 190; 524/423

[56] References Cited

U.S. PATENT DOCUMENTS

| | | | |
|---|---|---|---|
| 4,172,859 | 10/1979 | Epstein | 428/402 |
| 4,322,333 | 3/1982 | Kochanowski et al. | 523/521 |
| 4,351,758 | 9/1982 | Lu et al. | 524/227 |
| 4,369,280 | 1/1983 | Dieck et al. | 524/281 |
| 4,369,282 | 1/1983 | Campbell | 524/445 |
| 4,379,190 | 4/1983 | Schenck | 428/95 |
| 4,780,402 | 10/1988 | Remmington | 430/533 |
| 4,879,328 | 11/1989 | Karasawa et al. | 524/109 |
| 4,914,152 | 4/1990 | Miyashita et al. | 525/68 |
| 5,004,782 | 4/1991 | Mashita et al. | 525/64 |
| 5,017,650 | 5/1991 | Nakamura et al. | 525/65 |
| 5,149,734 | 9/1992 | Fisher et al. | 524/423 |
| 5,208,292 | 5/1993 | Hert et al. | 525/116 |
| 5,298,546 | 3/1994 | Kirsch et al. | 524/423 |
| 5,395,875 | 3/1995 | Allen et al. | 524/413 |
| 5,510,398 | 4/1996 | Clark et al. | 523/171 |

FOREIGN PATENT DOCUMENTS

| | | | |
|---|---|---|---|
| 0 676 442 A1 | 10/1995 | European Pat. Off. | C08K 03/00 |
| 0 838 501 A2 | 4/1998 | European Pat. Off. | C08L 67/02 |
| 1-247454 | 10/1989 | Japan | C08L 67/00 |

*Primary Examiner*—Vasu Jagannathan
*Assistant Examiner*—Callie E. Shosho
*Attorney, Agent, or Firm*—James A. Jubinsky

[57] ABSTRACT

A highly filled, ceramic-like thermoplastic polyester resin molding composition, characterized as containing a polyethylene terephthalate base resin, an impact modifier system containing a copolymer and terpolymer, glass fibers, and a mineral filler. Shaped articles prepared from the molding composition exhibit a ceramic appearance and feel, glossy surface finish, improved impact strength, and high specific gravity.

18 Claims, No Drawings

HIGH DENSITY POLYESTER COMPOSITION

FIELD OF THE INVENTION

The present invention relates to high density, improved impact strength polyester molding compositions suitable for the preparation of shaped articles. Polyester resins may be combined with an impact modifier system, and certain fillers to prepare the molding composition exhibiting improved mechanical properties. Molded articles prepared from polyester compositions exhibit excellent mechanical properties, enhanced surface gloss, increased density, and improved impact strength. The compositions are suitable for the preparation of shaped articles exhibiting ceramic-like properties, e.g. gaming chips, ceramic insulators, tableware, billiard balls, and other applications wherein a ceramic substitute is desirable.

BACKGROUND OF THE INVENTION

Polyester resins, particularly polybutylene terephthalate (PBT) and polyethylene terephthalate (PET), are suitable for the preparation of molded articles because of its partially crystalline structure. Molded articles prepared from PBT, as a base resin, and various additives are known to exhibit good mechanical properties when subjected to severe mechanical stress and extreme heat. PBT/PET blends have been combined with other materials to improve the mechanical and chemical properties, i.e. molding characteristics, impact strength, thermal stability, flame stability, warping and surface appearance, for a host of applications. Generally, a plethora of materials have been blended with PBT and PET in an attempt to improve the properties of the blend without detracting from the characteristic properties provided by the resin.

The use of glass fibers as a PET reinforcing material is generally discussed in U.S. Pat. No. 3,368,995 to Furakawa et al. The inclusion of barium sulfate to provide highly filled PET/PBT blends is mentioned in U.S. Pat. No. 5,149,734 to Fisher et al., and U.S. Pat. Nos. 5,214,088 and 5,395,875 to Allen et al. Japan Laid-Open Pat. No. 1-247454, published Oct. 3, 1989 references an impact modifier additive for polyester resin compositions, characterized as a mixture of a copolymer of ethylene/ glycidyl(meth)acrylate and a copolymer of ethylene/(meth)acrylic acid. Lu et al., U.S. Pat. No. 4,341,758 teaches the addition of a nucleating agent to polyester blends to provide smooth, glossy surfaces to molded articles prepared therefrom. Kirsch et al., U.S. Pat. No. 5,298,546 suggests a polyalkylene terephthalate blend containing barium sulfate, reinforcing materials, and an elastomer-modifier based on (meth)acrylates.

It is desirous to provide a PET resin composition that is suitable for the preparation of shaped articles exhibiting a combination of high surface gloss, improved impact strength, high density, and ceramic-like feel. The composition should provide the benefits of a PET-filler material and be a suitable substitute for ceramic materials.

SUMMARY OF THE INVENTION

The present invention is directed to a highly filled, ceramic-like thermoplastic PET molding resin composition suitable for the preparation of shaped articles exhibiting high surface gloss, improved impact strength, and a ceramic-like feel. The composition may be characterized as containing at least about 17.0 weight percent of polyethylene terephthalate having an intrinsic viscosity of at least about 0.4 dl/g; at least about 60 weight percent of barium sulfate; at least about 6.0 weight percent of a glass filler; and an impact modifier system comprising at least about 0.5 weight percent of a functionalized or unfunctionalized ethylene/glycidyl methacrylate/methyl acrylate terpolymer; and at least about 3.5 weight percent of an ethylene/acrylic ester copolymer, based on a total of 100 weight percent, wherein shaped articles prepared from the composition exhibits a glossy surface, high impact strength and specific gravity. The composition is suitable for the preparation of shaped articles possessing PET qualities, a ceramic appearance and specific gravity, and is a suitable substitute for ceramic materials.

DETAILED DESCRIPTION OF THE INVENTION

Particularly, the invention is directed to a highly filled, ceramic-like thermoplastic PET resin composition, characterized as containing about 17.0 to about 24.0 weight percent of polyethylene terephthalate having an intrinsic viscosity of from about 0.4 to about 1.5 dl/g; about 60 to about 70 weight percent of barium sulfate; from about 6 to about 10 weight percent of a glass filler; and an impact modifier system comprising from about 0.5 to about 2.0 weight percent of a functionalized or unfunctionalized ethylene/glycidyl methacrylate/methyl acrylate terpolymer, and from about 3.5 to about 6.0 weight percent of an ethylene/acrylic ester copolymer, based on a total of 100 weight percent of the composition, wherein shaped articles prepared from the composition exhibits a glossy surface, a specific gravity of from about 1.7 to about 3.0, a Notched Izod of from about 0.7 to about 0.8 ft-lb/in, unnotched Izod of from about 2.0 to about 2.7 ft-lb/in (both measured by ASTM D 256), and a Gardner Impact from about 5.4 to about 6.2 in-lb (measured by ASTM D 5420).

One preferred embodiment of the invention is directed to a highly filled, ceramic-like thermoplastic PET resin composition characterized as containing about 21.6 weight percent of polyethylene terephthalate having an intrinsic viscosity of about 0.68 to about 0.86 dl/g; about 65 weight percent of barium sulfate; about 8.0 weight percent of a glass filler; and an impact modifier system comprising about 1.1 weight percent of an ethylene/glycidyl methacrylate/methyl acrylate terpolymer, and about 4.3 weight percent of an ethylene/acrylic ester copolymer, based on a total of 100 weight percent of the composition, wherein shaped articles prepared from the composition exhibits a glossy surface, a specific gravity of about 2.6, a Notched Izod of about 0.72 ft-lb/in, an Unnotched Izod of about 2.4 ft-lb/in, and a Gardner Impact about 5.8 in-lb. Yet another preferred embodiment provides a highly filled, ceramic-like thermoplastic PET resin composition, comprising about 21.6 weight percent of polyethylene terephthalate having an intrinsic viscosity of about 0.86 dl/g; about 65 weight percent of barium sulfate; about 8.0 weight percent of a glass filler; and an impact modifier system comprising about 1.1 weight percent of an ethylene/glycidyl methacrylate/methyl acrylate terpolymer, and about 4.3 weight percent of an ethylene/acrylic ester copolymer, based on a total of 100 weight percent of the composition, wherein shaped articles prepared from the composition exhibits a glossy surface, a specific gravity of about 2.6, a Notched Izod of about 0.7 ft-lb/in, an Unnotched Izod of about 2.7 ft-lb/in, and a Gardner Impact about 5.4 in-lb.

Polyethylene Terephthalate

Generally, a class of polyesters which may be useful to form the highly filled, impact modified PET may be prepared in a conventional manner such as by direct esterification of purified terephthalic acid and ethylene glycol or transesterification of dimethyl terephthalate with ethylene glycol as described in U.S. Pat. No. 2,465,319 to Whinfield et al. incorporated herein by reference thereto. Typically, polyethylene terephthalate useful in the invention may contain at least about 97 percent of repeating units of the general formula:

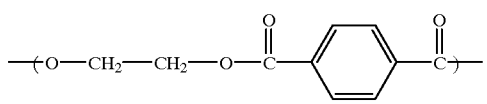

With the remainder being minor amounts of ester-forming components, and ethylene terephthalate wherein up to about 10 mole percent of the copolymer is prepared from the monomer units of diethylene glycol; 1,3-propanediol; 1,4-butanediol; polytetramethylene ether glycol;methyl propanediol; polyethylene glycol; polypropylene glycol; 1,4-hydroxymethylcyclohexane and the like, substituted for the glycol moiety in the preparation of the copolymer and/or isophthalic; bibenzoic; naphthalene 1,4- or 2,6-dicarboxylic adipic; sebacic; decane-1,10-dicarboxylic acid, and the like substituted for the acid moeity in the preparation of the copolymer. Polyethylene terephthalate resins can be prepared in accordance with U.S. Pat. No. 3,047,534 incorporated herein by reference thereto. The preferred PET, Impet® 100, is an unfilled polyester manufactured and distributed by Ticona LLC of Summit, N.J. Impet 100 may be identified as exhibiting physical properties as follows: density of 1.39 g/cm$^3$; melt point of 252° C.; L color (amorphous) of 80; b* color (amorphous) of 3; and melt viscosity at 1000 sec$^{-1}$ at 280° C. of 1560 poise.

Generally, the intrinsic viscosity of the polymeric material of the invention is from about 0.4 to about 1.5 dl/g as measured in accordance with ASTM D 2857. Typically, intrinsic vicosity may be from about 0.6 to about 1.2 dl/g, and preferably from about 0.68 to about 0.86 dl/g.

Impact Modifier System

The impact modifier system of the invention is believed to provide the composition with its impact resistant characteristics. Suitable impact modifiers may be selected from copolymers of ethylene/acrylic ester, and terpolymers of ethylene/acrylic ester/glycidyl methacrylate. Generally, the impact modifier system may be incorporated into the resin composition in amounts of from about 4.0 to about 6.0 weight percent, based on a 100 total weight percent of the composition, at a ratio of about 1:4 of terpolymer to copolymer. Typically, the impact modifier system may be incorporated into the resin composition in amounts of from about 4.2 to about 4.6 weight percent, and preferably 4.4 weight percent. According to the preferred embodiment of the invention, the impact modifier system may contain 1.1 weight percent of the terpolymer and 4.3 weight percent of the copolymer.

The preferred terpolymer is marketed under the trade name Lotader® AX8900 and is distributed by Elf Atochem North America, Inc. of Philadelphia, Pa. The preferred copolymer is marketed under the trade name Lotryl® 29MA03 and is also distributed by Elf Atochem North America, Inc. of Philadelphia, Pa.

Lotader® AX8900 (CAS #51541-08-3), identified as containing 26 weight percent of methyl acrylate comonomer and 7.25 weight percent of glycidyl methacrylate/methyl acrylate, exhibits a melt index (190° C., 2.16 kg ASTM D 1238) of 6.5, a melting point (DSC) of 149° F., a Vicat Softening Point (ASTM D 1525-1 kg) of <100, a tensile strength at break (ASTM D 638) of 810 psi, an elongation at break (ASTM D 638) of 900, and a Hardness A (ASTM D 2240) of 70. Lotryl® 29MA03 (CAS #25103-74-6), a copolymer of ethylene/acrylic ester, identified as containing 27 to 31 percent of the ester (Elf Atochem (IR), exhibits a melt index (g/10 mm)(ASTM D 1238, ISO Standard 133) of 2 to 3.5, a melting point (DSC) of 61° C., and a Viscat Softening Point (ASTM D 1525, ISO Standard 306) of <40° C.

Generally, the impact modifier system may contain a combination of at least about 1.0 weight percent of an ethylene/glycidyl methacrylate/methyl acrylate terpolymer, and at least about 4.0 weight percent of an ethylene/acrylic ester copolymer, based on 100 total weight percent of the composition. Typically, the impact modifier system may contain from about 1.0 to about 1.3 weight percent of the an ethylene/ glycidyl methacrylate/methyl acrylate terpolymer, and from about 4.0 to about 4.5 weight percent of the ethylene/acrylic ester copolymer; and preferably, about 1.1 weight percent of the ethylene/glycidyl methacrylate/methyl acrylate terpolymer and ethylene/acrylic ester copolymer, based on 100 total weight percent of the composition. The preferred total weight of the impact modifier system may be about 5.4 weight percent of the two (2) above-identified components.

The Barium Sulfate

Barium sulfate is believed to provide the molding composition of the invention with its highly filled, high specific gravity characteristics and ceramic-like properties. Generally, the barium sulfate, barytes, useful for the invention may be present in an amount of at least about 60 weight percent, based on a total of 100 weight percent of the composition. Typically, the barium sulfate may be present in an amount of from about 60 to about 70 weight percent, based on a total of 100 weight percent of the composition, and preferably in an amount of about 65.0 weight percent. Suitable barium sulfate particles may range in size of from about 0.5 to about 1.5 µm. The preferred barium sulfate suitable for the invention is Barite 1090P marketed by Polar Minerals of Mount Vernon, Ind. Barite, barium sulfate, is known to exhibit an average particle size of about 0.9 µm (about 5 µm top size).

The Fiberglass

Glass fibers are believed to enhance the reinforcing properties of the present invention. Glass fibers of the present invention will generally exhibit an average standard diameter of from about 5 to about 30 microns. Typically, the glass fibers will exhibit an average diameter of from about 10 to about 20 microns, and preferably from about 12 to about 18 microns. For the purpose of the invention, it is conventional to use filamentous glass in the form of chopped strands of from about 1.5 mm to about 10 mm in length; typically, from about 2 to about 8 mm and preferably of about 4 mm in length. The aspect ration of the glass fibers (the average length of the diameter of the fibers) of about 5. Generally, glass fibers may be present in an amount of at least about 6.0 weight percent. Typically, the amount of glass fibers in the molding composition may be from about 6.0 to about 10.0 weight percent, based on a total of 100 weight percent of the composition, and preferably, in an amount of about 8.0 weight percent. A preferred glass fiber is marketed by Owens-Corning Fiberglas Corporation of Toledo, Ohio under the trade name Fiberglass OCF 183F-14C. Fiberglass OCF 183F-14C is characterized as an E-glass composition exhibiting an average fiber diameter of about 14 microns containing an amino silane coupling agent and a proprietary sizing agent.

Other Additives

Other additives in effective amounts that do not distract from the novelty or mechanical properties of the molding composition may be incorporated therein. The additive pentaerythritol tetrastearate is a dispersing agent for the barium sulfate in the base resin an will also function as an external lubricant or mold release agent. Suitable antioxidants include phosphites, hindered phenols, secondary amines and the like, which may be added in effective amounts to retard oxidative degradation. A suitable antioxidant is tetrakis(methylene-3(3',5'-di-tert-butyl-4-hydroxyphenyl) propionate)methane. Flame retardant agents and pigments may be added in effective amounts. Suitable flame retardant agents for the invention are disclosed in U.S. Pat. Nos. 3,334,154; 4,020,124; and 4,785,592. External lubricants including fatty acids, fatty esters, wax esters, glycerol esters, glycol esters, fatty alcohol esters, fatty alcohols, fatty amides, metallic stearates, and waxes are not required components of the invention but may be utilized as necessary as mold release agents. In addition other components well known in the art such as pigments, ultraviolet stabilizers, antistatic agents, etc. which do not detract from the invention may be added thereto.

Suitable uses for the highly filler thermoplastic resin molding composition include all applications wherein it is desirous to provide a thermoplastic resin substitute for ceramic materials. In additional to the mechanical properties offered by PET, the inventive molding resin possesses improved impact strength and a high specific gravity. The composition is suitable for the preparation of gaming chips, electrical insulation parts, tableware and billiard balls.

The following examples are presented as specific illustrations of the claimed invention. It should be understood, however, that the invention is not limited to the specific details set forth in the examples.

EXAMPLE 1

To prepare a blend of the highly filled, ceramic-like thermoplastic, polyester resin (0.68 IV) composition, the following components were utilized:

a) 4.32 lbs. of Impet 100 (PET1511), 0.681 IV b) 1.6 lbs. of Fiberglas OCF 183F-14C, 4 mm length;

c) 13 lbs. of Barite 1090P;

d) 99.79 gm. of Lotader AX8900; and e) 390.1 gm. of Lotryl 29 MA 03.

The above ingredients were blended in dry form and then extruded in a 30 mm Werner and Pfleiderer twin screw ZSK 30 extruder, heated and purged with PET operated at an average temperature of about 260° C., a die temperature of about 267° C., screw speed of about 250 rpm, torque of about 38%, die pressure of about 235 psi, and vacuum of about 28 mm Hg. Thereafter, the extruded material was pelletized and injection molded on a 22S Boy injection molder under the following conditions:

| Barrel temperature, | (°C.) |
|---|---|
| Zone #1 | 265 |
| Zone #2 | 270 |
| Zone #3 | 275 |
| Mold Temp, | (°C.) |
| Field | 120 |
| Movable | 120 |
| Pressure, | (%) |
| Inject #1 | 63 |
| Speeds, | (%) |
| Screw | 50 |
| Inject #1 | 90 |
| Time, | sec |
| Inject #1 | 9 |
| Cool | 19 |

The molded parts were ASTM D 638 Type 1 tensile bars, 2 in. disks and 5 in. flex bars. The mechanical properties of the test specimens are listed in the Table hereinafter.

EXAMPLE 2

To prepare a blend of the highly filled, ceramic-like thermoplastic, polyester resin (0.86 IV) composition, the following components were utilized:

a) 4.32 lbs. of PET 0.86 IV;

b) 1.6 lbs. of Fiberglas OCF 183F-14C, 4 mm length;

c) 13 lbs. of Barite 1090P;

d) 99.79 gm. of Lotader AX8900; and e) 390.1 gm. of Lotryl 29 MA 03.

The components were blended, extruded and molded into tensile bars, disks, and flex bars in accordance with the procedure of Example 1. Results of mechanical properties of the test specimens are listed in the Table.

COMPARATIVE EXAMPLE 3

To illustrate the benefits of the impact modifier system, a PET comparative composition, 0.68 IV, was prepared in accordance with the procedure of Example 1; titanium dioxide acts as a pigment additive. The components and amounts of the composition are as follows:

a) 4.96 lbs. of Impet 100 (PET1511), 0.68 IV;

b) 1.6 lbs. of Fiberglas OCF 183F-14C, 4 mm length;

c) 12.6 lbs. of Barite 1090P; and d) 190.51 gm. of titanium dioxide (in 381.02 gm. of polybutylene terephthalate (PBT) concentrate).

The components were blended, extruded and molded into tensile bars, disks, and flex bars in accordance with the procedure of Example 1. Results of mechanical properties of the test specimens are listed in the Table.

COMPARATIVE EXAMPLE 4

A second PET comparative composition, 0.86 IV, have no impact modifier system therein was prepared in accordance with Example 1, the components are as follows:

a) 4.96 lbs. of PET, 0.86 IV;

b) 1.6 lbs. of Fiberglas OCF 183F-14C, 4 mm length;

c) 12.6 lbs. of Barite 1090P; and d) 190.51 gm. of titanium dioxide (in 381.02 gm. of PBT concentrate).

These components were blended, extruded and molded into tensile bars, disks, and flex bars in accordance with the procedure of Example 1. Results of mechanical properties of the test specimens are listed in the Table.

TABLE

| Example | Impact Modified PET Formulation (wt %) | | PET Based Formulation (wt %) | |
| --- | --- | --- | --- | --- |
| | 1 | 2 | Comp. 3 | Comp. 4 |
| PBT 0.76 IV | | | 2.2 | 2.2 |
| PET 0.68 IV | 21.6 | | 24.8 | |
| PET 0.86 IV | | 21.6 | | 24.8 |
| Glass Fiber | 8.0 | 8.0 | 8.0 | 8.0 |
| TiO$_2$ | | | 2.0 | 2.0 |
| Lotader AX8900 | 1.1 | 1.1 | | |
| Lotryl 29 MA 03 | 4.3 | 4.3 | | |
| BaSO$_4$ | 65.0 | 65.0 | 63.0 | 63.0 |
| Specific Gravity | 2.6 | 2.6 | 2.6 | 2.6 |
| Izod, Notched (ft-lb./in) | 0.7 | 0.7 | 0.3 | 0.3 |
| Izod, Unnotched (ft-lb./in) | 2.4 | 2.7 | 1.3 | 1.1 |
| Impact, Gardner (in-lb.) | 5.8 | 5.4 | 3.6 | 3.8 |
| Surface Appearance | Glossy | Glossy | Glossy | Glossy |

The results of the examples illustrate that shaped articles prepared from compositions containing the impact modifier system, as compared to examples not containing the system, exhibit improved Notched and Unnotched Izods, and Gardner Impacts.

We claim:

1. A highly filled, ceramic-like thermoplastic polyester ressin composition, comprising at least about 17.0 weight percent of polyethylene terephthalate having an intrinsic viscosity of at least about 0.4 dl/g; at least about 60 weight percent of barium sulfate; at least 6.0 weight percent of a glass filler; and an impact modifier system comprising about 0.5 to about 2.0 weight percent of a functional or non-functional ethylene/glycidyl methacrylate/methyl acrylate terpolymer, and about 3.5 to about 6.0 weight percent of an ethylene/acrylic ester copolymer, based on a total of 100 weight percent, wherein shaped articles prepared from the composition exhibits a glossy surface, high impact strength and specific gravity.

2. The composition according to claim 1, wherein the polyethylene terephthalate is present in an amount from about 17.0 to about 24.0 weight percent.

3. The composition according to claim 2, wherein the intrinsic viscosity of the polyethylene terephthalate is from about 0.4 to about 1.5 dl/g.

4. The composition according to claim 3, wherein the intrinsic viscosity of the polyethylene terephthalate is from about 0.68 to about 0.86 dl/g.

5. The composition according to claim 4, wherein the barium sulfate is present in an amount of from about 60 to about 70 weight percent.

6. The composition according to claim 5, wherein the glass fibers are present in an amount of from about 6 to about 10 weight percent.

7. The composition according to claim 6, wherein the impact modifier system is present in an amount of from about 4.0 to about 6.0 weight percent.

8. The composition according to claim 7, wherein the impact modifier system comprises a terpolymer consisting of a functionalized or unfunctionalized ethylene/glycidyl methacrylate/methyl acrylate, and a copolymer consisting of ethylene/acrylic ester in a ratio of about 1 to 4, respectively.

9. The composition according to claim 8, wherein the composition exhibits a specific gravity of from about 1.7 to about 3.0, a Notched Izod of from about 0.7 to about 0.80 ft-lb/in, an Unnotched Izod of from about 2.0 to about 2.7 ft-lb/in, and a Gardner Impact of from about 5.4 to about 6.2 in-lb.

10. A highly filled, ceramic-like thermoplastic polyester resin composition, comprising about 17 to about 24 weight percent of polyethylene terephthalate having an intrinsic viscosity of at least about 0.4 dl/g; at least about 60 weight perceht of barium sulfate; at least about 6.0 weight percent of a glass filler; and an impact modifier system comprising at least about 0.5 weight percent of a functional or non-functional ethylene/glycidyl methacrylate/methlyl acrylate terpolymer, and at least about 3.5 weight percent of an ethylene/acrylic ester copolymer, based on the total weight of said polyester resin composition wherein shaped articles prepared from the composition exhibits a glossy surface, high impact strength and specific gravity.

11. A ceramic-like, glossy, high density shaped article exhibiting improved impact strength prepared from the composition according to claims 1 or 10.

12. The shaped article according to claim 11 selected from the group consisting of is a gaming chip, ceramic insulator, tableware or billiard ball.

13. The composition according to claim 10, wherein the intrinsic viscosity of said polyethylene terephthalate is from about 0.4 to about 1.5 dl/g.

14. The composition according to claim 13, wherein the intrinsic viscosity of said polyethylene terephthalate is from about 0.68 to about 0.86 dl/g.

15. The composition according to claim 10, wherein the barium sulfate is present in an amount of about 60 to about 70 weight percent.

16. The composition according to claim 10, wherein the glass fibers are present in an amount of about 6 to about 10 weight percent.

17. The composition according to claim 10, wherein the impact modifier system is present in an amount of about 4 to 6 weight percent.

18. The composition according to claim 10, wherein the impact modifier system comprises a terpolymer consisting of a frinctionalized or unfunctionalized ethylene/glycidyl methacrylate/methyl acrylate, and a copolymer consisting of ethylene/acrylic ester in a ratio of about 1 to 4, respectively.

* * * * *